United States Patent [19]

Langner

[11] Patent Number: 4,588,326
[45] Date of Patent: May 13, 1986

[54] SUBSEA PIPELINE CONNECTION
[75] Inventor: Carl G. Langner, Spring, Tex.
[73] Assignee: Shell Oil Company, Houston, Tex.
[21] Appl. No.: 564,605
[22] Filed: Dec. 22, 1983
[51] Int. Cl.$^4$ ............................................... F16L 1/04
[52] U.S. Cl. .................................... 405/169; 166/338; 405/168
[58] Field of Search ......................... 405/195, 168–171, 405/158; 166/338–344

[56] References Cited

U.S. PATENT DOCUMENTS

| 3,219,118 | 11/1965 | Lewis | 166/351 |
|---|---|---|---|
| 3,260,270 | 7/1966 | Watkins et al. | 166/343 X |
| 3,298,092 | 1/1967 | Dozier et al. | 405/169 X |
| 3,352,356 | 11/1967 | Wakefield | 405/169 X |
| 3,373,807 | 3/1968 | Fischer et al. | 405/169 X |
| 4,225,270 | 9/1980 | Dareing | 405/168 |
| 4,277,202 | 7/1981 | Archambaud et al. | 166/343 X |

Primary Examiner—Dennis L. Taylor

[57] ABSTRACT

A method and apparatus are provided for connecting an offshore pipeline or flowline bundle to a deepwater subsea structure and then laying away from the structure. The pipeline or flowline bundle is deployed from a pipelay vessel while connected via a pullcable to a riser deployed from a drilling ship to make a connection with the subsea structure. The connection operation is facilitated by a remotely operated connection tool deployed at the end of the riser, which contains a winch for hauling in the pullcable, as well as other mechanisms for securing the pipeline or flowline bundle to the subsea structure. The connection procedure comprises simultaneously lowering the pipeline or flowline bundle and the riser/connection tool to a position near the seafloor, then landing and securing the connection tool onto the subsea structure, then pulling up the pipeline or flowline bundle and securing it to the subsea structure, and finally recovering the connection tool to the surface as the pipeline or flowline bundle is laid away from the subsea structure.

9 Claims, 7 Drawing Figures

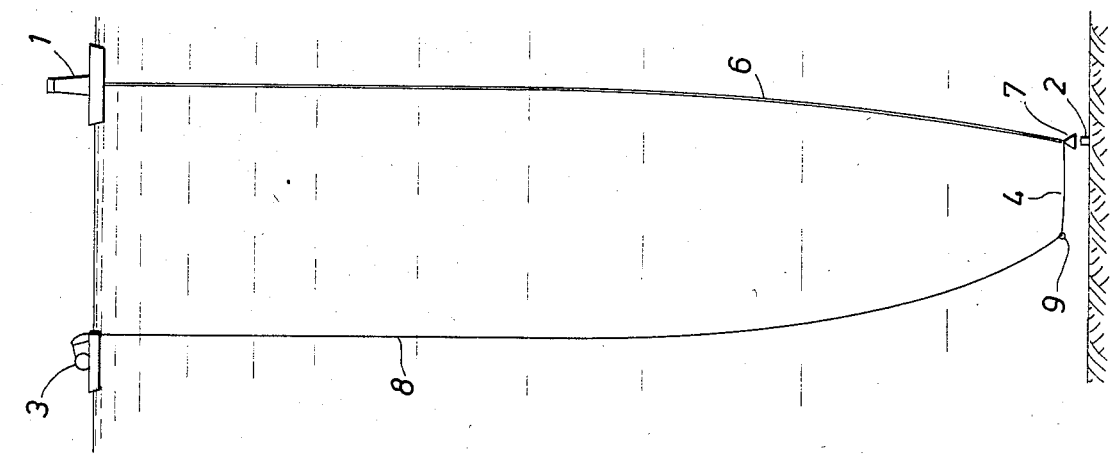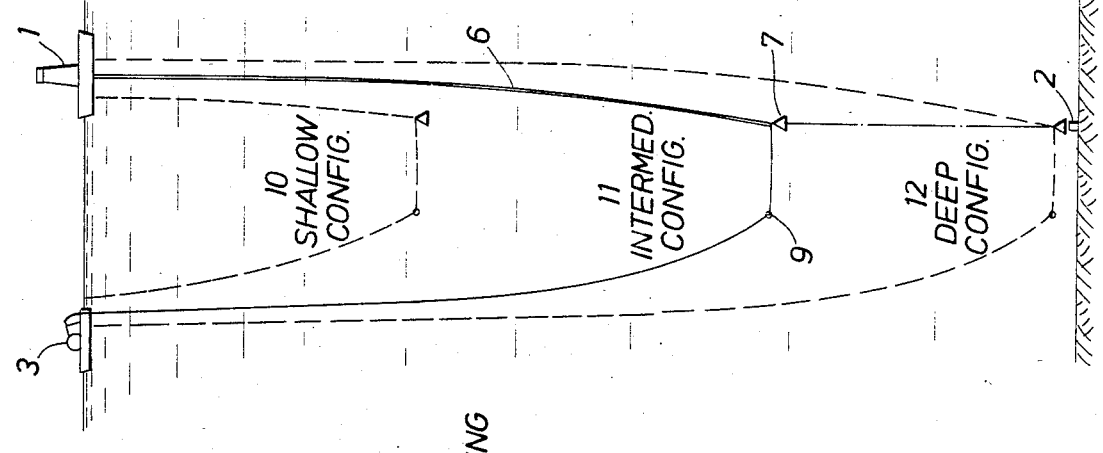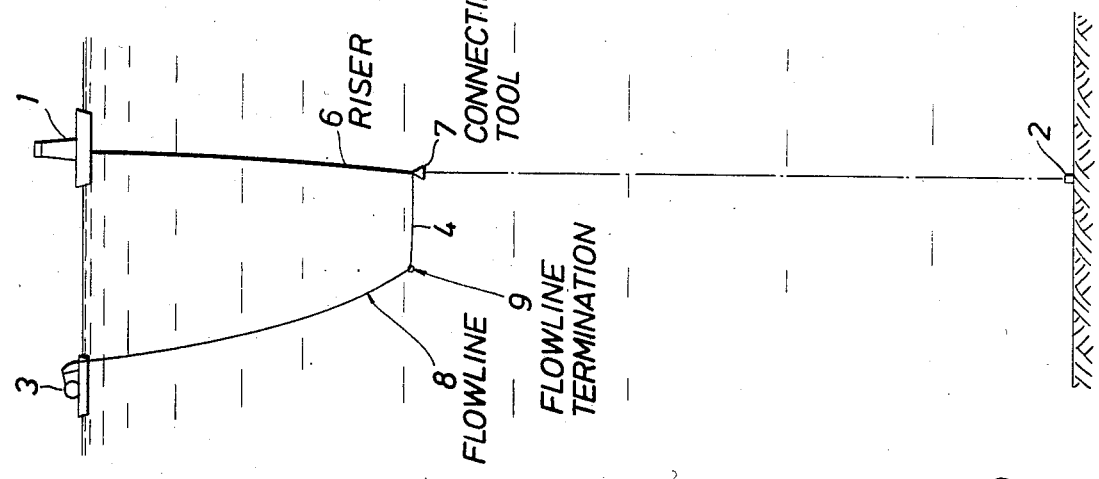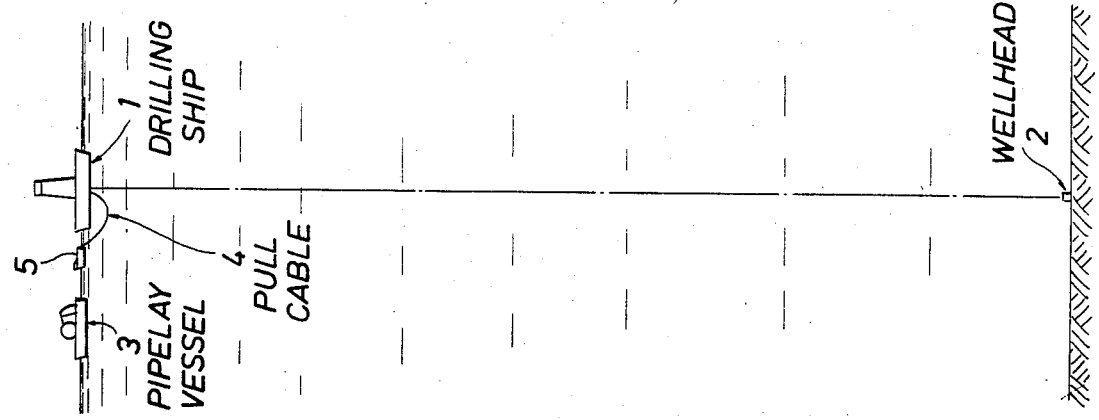

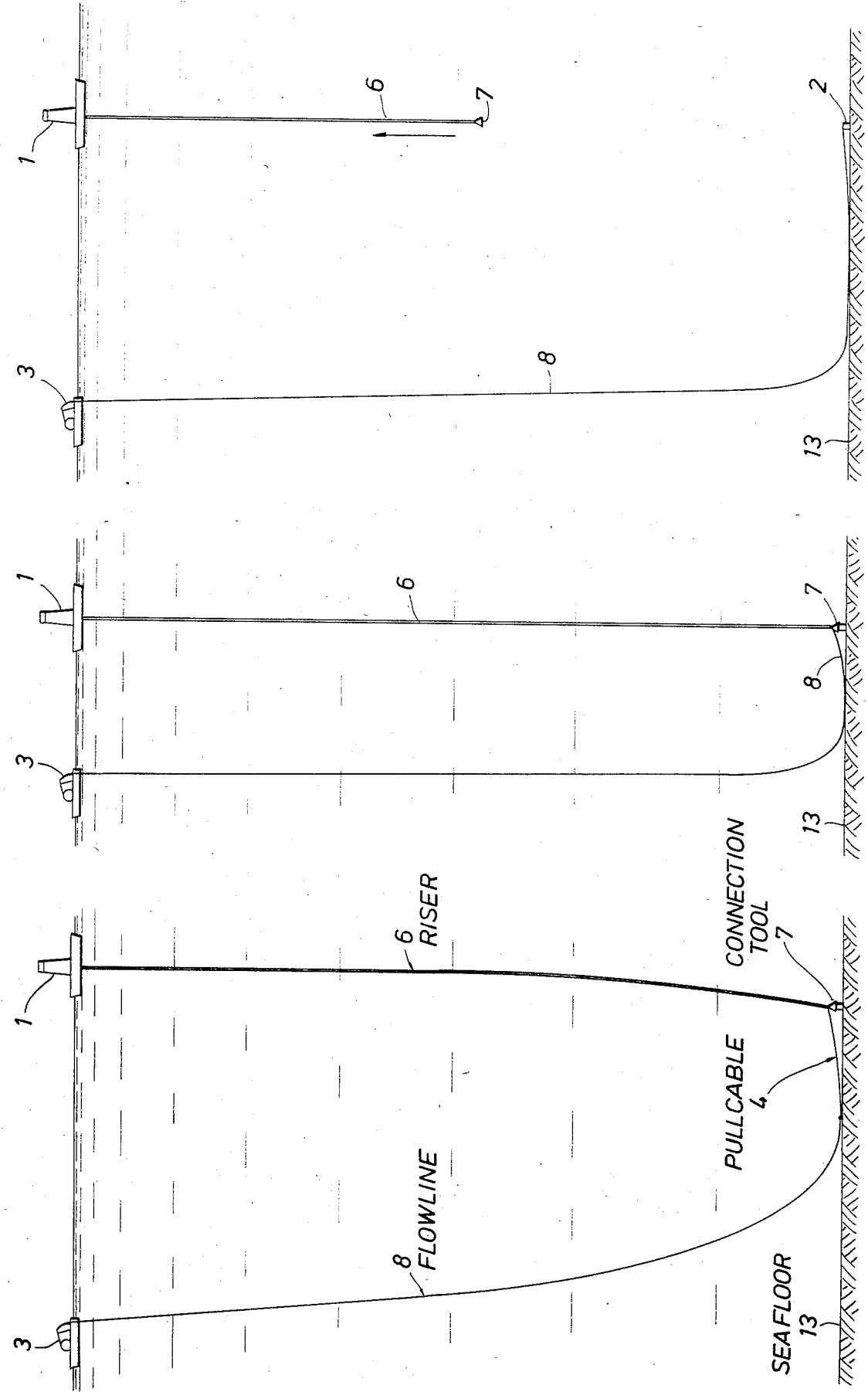

SUBSEA PIPELINE CONNECTION

BACKGROUND OF THE INVENTION

Connecting a pipeline or flowline bundle to a subsea production facility can be a very arduous and time consuming procedure, particularly in deep water. Depending upon the connection technique employed, if the pipeline is laid outside a specific target area, literally months can be spent correcting the error. This is not hard to understand once it is appreciated that the pipeline may be hundreds or even thousands of feet below the pipelay vessel, relatively immobile, and difficult to remotely manipulate. One method for approaching this problem is the so-called lateral deflection technique covered by U.S. Pat. No. 4,145,909. In accordance with that technique, a pipeline is deliberately laid to one side of and somewhat past the subsea production facility, and subsequently the pipeline is bent or deflected to make connection with the facility. This technique, while operable, nonetheless suffers from several drawbacks. First, the pipe ends must be laid down into a rather small target area and a means of pulling the pipe end toward the subsea production facility must be established. Second, the lateral deflection technique is at the mercy of unpredictable soil behavior as the pipeline must be pulled across often treacherous terrain as it sweeps toward the subsea production facilitY. Thus, the approach angle of the pipeline to the production facility is often unpredictable because of boulders or other obstacles which disrupt the motion of the pipeline as it is deflected toward the production facility. This latter problem may be overcome to some extent by cleaning the area over which the pipeline is to be deflected or by supporting the pipe offbottom with a system of buoys and chains as described in U.S. Pat. No. 4,145,909. The lateral deflection technique has the further disadvantage that the area swept out by the pipe as it is deflected toward the subsea facility is large and this area is then unavailable for the installation of other equipment. A related drawback resides in the stresses introduced into the pipeline not only because of boulders and other obstacles in the path of deflection which, in an extreme case, may buckle the pipeline but also in the backward and lateral pulling on the pipeline necessary to deflect it toward the production facility. Even further, the lateral deflection technique is unduly complicated, requiring one or more tow vessels, as well as a drilling vessel to (1) land a large sled at the end of the pipeline into a specified target area on the seabed, while laying the pipeline along a path adjacent to well, (2) land a pull-in tool onto the sled and establish a connection between the sled and a pullcable carried by the pull-in tool, (3) pay out the pullcable while moving the pull-in tool between the sled and the production facility, (4) land the pull-in tool on the production facility, and finally (5) perform the deflection and pull-in operations.

Applicant is not aware of any other prior art which, in his judgment as one skilled in the pipeline art, would anticipate or render obvious this novel pipelay technique of the present invention; however, for the purposes of fully developing the background of the invention and establishing the state of the requisite art, the following art is set forth: U.S. Pat. Nos. 3,431,739 and 3,214,921.

SUMMARY OF THE INVENTION

The primary purpose of the present invention is to provide a method and apparatus for connecting and laying an offshore pipeline or flowline bundle from a subsea structure, which method and apparatus are relatively simple and economical to use and which do not subject the pipeline or flowline bundle to dangerous stresses. Preferably, the pipeline or flowline bundle is deployed from a surface craft (typically a floating pipelay vessel) and is connected to a riser which is deployed from a second surface craft (typically a fixed or floating drilling vessel) stationed nearby. The pipeline or flowline bundle is lowered to the seabottom simultaneously as the riser is lowered and landed onto the subsea structure. Finally, the riser is utilized to connect the pipeline or flowline bundle to the subsea structure.

More preferably, a connection tool is deployed at the lower end of the riser, which performs the functions of landing and latching the riser onto the subsea structure, connecting the pipeline or flowline bundle to the subsea structure, and releasing the riser from both the pipeline or flowline bundle and the subsea structure. Most preferably, the connection tool contains a cable pulling means for hauling in a pullcable, which pullcable is connected to the end of the pipeline or flowline bundle. After the connection tool is landed and latched onto the subsea structure, the pullcable and pulling means are utilized to pull the pipeline or flowline bundle up to the connection tool, and the connection tool is then utilized to connect the pipeline or flowline bundle to the subsea structure.

Also preferably, the pipeline or flowline bundle may be at least partially landed on the seabottom at the time the connection tool is landed on the subsea structure and/or during the pull-in operation. Pipelaying away from the subsea structure may begin at any time after the pull-in operation is completed.

The primary distinctions of the present invention over the most relevant prior art reside in (b 1) the use of a riser, pullcable, and connection tool to connect the pipeline or flowline bundle to the subsea structure, and (2) in the use of an essentially vertical pipelay technique, both for making the connection with the subsea structure and for pipelay, which technique is simple and completely reversible at any time. The second feature, wherein the pipeline or flowline bundle is vertically laid, substantially eliminates the dangerous stresses on the pipeline or flowline bundle which occur in the relevant prior art processes.

Other purposes, distinctions over the prior art, advantages and features of the invention will be apparent to one skilled in the art upon review of the following.

BRIEF DESCRIPTION OF THE DRAWINGS

FIG. 1 shows the initial procedure of the invention for connecting a flowline to a subsea structure, wherein a drilling ship is stationed directly over the subsea structure, depicted here as a wellhead, with a pipelay vessel stationed a short distance away. A pullcable is passed between the drilling ship and the pipelay vessel.

FIG. 2 shows lowering a connection tool and riser from the drilling ship simultaneously while a paying out the flowline from the pipelay vessel.

FIG. 3 discloses continued simultaneous lowering of the riser from the drilling ship and the flowline from the pipelay vessel, alternatively depicting shallow, intermediate, and deep configurations.

FIG. 4 shows suspending the connection tool and riser a short distance above the wellhead in preparation for landing the connection tool onto the wellhead.

FIG. 5 depicts landing the connection tool on the wellhead. The flowline may first be lowered onto the sea floor or it may be positioned a short distance above the sea floor during this landing operation.

FIG. 6 discloses pulling the flowline up to the connection tool. The flowline is then oriented and secured to the wellhead.

FIG. 7 shows commencing pipelaying and recovering the connection tool to the surface.

DESCRIPTION OF A PREFERRED EMBODIMENT

The present invention is relevant to embodiments wherein an offshore pipeline or flowline bundle (both "pipeline" and "flowline bundle" hereinafter being termed "flowline") is deployed essentially vertically to a subsea structure, typically an oil and/or gas production facility, which may be an individual subsea wellhead, a multi-well subsea template, an underwater manifold center, a tension leg platform base structure, etc. This invention pertains in particular to a method and apparatus for connecting the flowline to the subsea production facility. During the connection operation, the apparatus to be used with a pipelay vessel and drilling ship (as used hereinafter, "pipelay vessel" will include all "surface craft" suitable for pipelaying and "drilling ship" will include all "surface craft", including both fixed and floating platforms, suitable for deploying a "riser" or the like) will typically include a riser, a connection tool, a pullcable, a flowline, a flowline termination, and receptacles for both the connection tool and the flowline termination, which receptacles are part of the subsea structure. The connection tool is deployed at the lower end of the riser and contains remotely controlled mechanisms for latching onto the subsea structure, for hauling in the pullcable and thereby pulling the flowline termination up to the connection tool, for orienting and securing the flowline to the subsea structure, and for releasing from both the flowline and the subsea structure.

Applicant's copending applications Ser. No. 499,013, filed May 27, 1983 and Ser. No. 516,086, filed July 22, 1983 now U.S. Pat. No. 4,541,753 are incorporated herewith for more specific disclosure of the flowline receiving means and other apparatus and procedure.

The connection of the flowline to the subsea structure is accomplished by first stationing a drilling ship over the subsea structure, such as a wellhead. A pipelay vessel is positioned a short distance away, and a pullcable (which may be a wire rope) is then passed between the drilling ship and the pipelay vessel. At one end the pullcable is connected to the termination of the flowline to be laid from the pipelay vessel. At the other end the pullcable is connected to a winch or other cable pulling means incorporated into a connection tool deployed at the end of a riser from the drilling ship. The connection tool and riser from the drilling ship are lowered simultaneously while paying out the flowline from the pipelay vessel. The connection tool is then landed on and latched to the subsea structure. The flowline may be lowered onto the sea floor in order to isolate motions of the flowline from the connection tool and the riser. By means of the pullcable and winch, the flowline termination is pulled up to the connection tool. Mechanisms on the connection tool then grip and orient the flowline termination and secure it to the subsea structure. At this point it is feasible to commence laying of the flowline away from the subsea structure, and to recovery the connection tool to the surface.

The present invention is especially advantageous in comparison with the prior art inasmuch as only two vessels are required to deploy and connect the flowline to the subsea structure in a continuous, relatively uncomplicated procedure. This should be compared to the aforementioned lateral deflection technique of the prior art wherein more than two vessels, including tugboats or pipelay vessel, drilling vessel, and other support vessels, may be employed. Further advantages include the following: (1) The connection procedure is independent of the water depth, and therefore is especially advantageous in very deep waters where conventional methods are found to be difficult and tedious. (2) The procedure of the present invention is simple and straightforward, having been demonstrated numerous times in scale model tests. (3) The procedure is reversible, enabling easy recovery if problems arise. (4) The flowline, flowline termination, and flowline receptacle can be made small and simple, since all connection operations and controls are incorporated into the connection tool and are transmitted thereto via control lines in the riser. (5). The same basic connection tool may be used to perform either a first-end flowline connection, as in the present invention, or a second-end flowline connection, as described in application Ser. No. 499,013, filed May 27, 1983.

Having thus generally described the apparatus and method of the present invention, as well as its numerous advantages over the most relevant prior art, the following is a more detailed description thereof given in accordance with specific reference to the drawings.

The initial procedure of the present invention is shown in FIG. 1 wherein a drilling ship 1 is positioned above, preferably essentially directly over, a subsea structure such as wellhead 2. Positioned close to the drilling ship 1 is pipelay vessel 3, preferably from about 500 to about 2,000 feet apart. Once the pipelay vessel and drilling ship are on station, pullcable 4 is taken from one vessel to the other vessel, preferably from drilling ship 1 to pipelay vessel 3, and preferably by a smaller vessel 5.

As shown in FIG. 2, pullcable 4 is attached to riser 6 being lowered from drilling ship 1. At the terminus of riser 6 is a connection tool 7, more fully described in applicant's copending applications above cited, and to which is preferably attached pullcable 4. At the opposite end of pullcable 4 is attached flowline 8, proceeding from pipelay vessel 3. Preferably pullcable 4 is attached to the termination 9 of flowline 8. The length of the pullcable may vary preferably from about 100 feet to about 1,000 feet. Most preferably, the pullcable length between the connection tool and the flowline termination should be approximately 10% of the water depth throughout the lowering operation. Connection tool 7 and riser 6 are lowered from drilling ship 1 simultanqously while paying out flowline 8 from pipelay vessel 3. The preferred rate of lowering is generally in the order of 10 to 100 feet per minute.

In FIG. 3 is shown various configurations of the riser, flowline and pullcable, depending upon the payout length of the riser and flowline. It is evident that the drilling ship and pipelay vessel are further apart, proceeding from shallow configuration 10 (in phantom) to intermediate configuration 11, to deep configuration 12

(in phantom). Also evident is the movement of the drilling ship from directly over the subsea structure 2 to further out as the length of the riser increases. The relative positioning of the pipelay vessel and drilling ship depends also upon the relative weights of the riser, flowline, and connection tool. Thus, for a substantially heavier flowline as compared to the riser, the drilling ship must be positioned further out. Positioning of the vessels must also take into account the effects of any currents.

A vital part of the connection tool 7 at this stage in the connection procedure will be a mechanism for cutting or otherwise quickly releasing the pullcable 4 from the connection tool. In the event that one or both of the surface craft are no longer able to hold their position, for example, this quick-release mechanism would disconnect the flowline 8, together with a length of pullcable 4, from the riser 6 and the connection tool 7, thereby enabling each element to be safely recovered onto the respective surface craft prior to making another attempt to connect the flowline to the well.

FIG. 4 shows the connection tool 7 positioned directly above the wellhead 2 in preparation for landing the connection tool onto the wellhead. At this stage movement of the connection tool 7 is affected primarily by movement of the drilling ship 1 and riser 6, but also is affected somewhat by movement of the pipelay ship 3 and flowline 8. Consequently, as shown in FIG. 5, it may be preferable to lower part of flowline 8 and pullcable 4 onto seafloor 13 in order to isolate motions of flowline 8 from connection tool 7. In this case movement of the connection tool in the direction of the pullcable is controlled by paying out or pulling in the pullcable 4 from the connection tool 7. As a general rule, one must never allow the pullcable to become slack, as a slack cable is much more likely than a taut cable to self-tangle or to become snagged around some object on the seafloor.

In FIG. 6, flowline connection tool 7 has been landed on subsea structure 2 and the termination 9 of the flowline 8 is pulled up to the subsea structure by means of pullcable 4. At this time it may be necessary for the connection tool to grip and properly orient the flowline termination 9 prior to securing it to the subsea structure.

The final procedure of the present invention is shown in FIG. 7 wherein pipelaying from the subsea structure 2, such as a wellhead, is commenced, and the connection tool 7 is recovered to the surface by means of riser 6.

The foregoing description of the invention is merely intended to be explanatory thereof. Various changes in the details of the described method and apparatus may be made within the scope of the appended claims without department from the spirit of the invention.

What is claimed is:

1. A method for connecting and laying a flowline from a subsea structure on the seafloor comprising:
   connecting the flowline from a first vessel to a riser from a second vessel;
   deploying the flowline and riser downardly to the subsea structtture;
   connecting the riser to the subsea structure;
   connecting the flowline to the subsea structure;
   laying the flowline on the seafloor from the subsea structure; and
   disconnecting the riser from both the flowline and the subsea structure.

2. The method of claim 1 wherein the flowline is connected to the riser via a pullcable.

3. The method of claim 2 wherein the pullcable is utilized to pull the flowline to the subsea structure.

4. The method of claim 3 wherein the flowline is at least partially lowered onto the sea floor before the pullcable is utilized to pull the flowline to the subsea structure.

5. The method of claim 1 wherein the riser is connected to a connection tool which in turn is connected to a pullcable.

6. The method of claim 5 wherein the connection tool is landed on and latched to the subsea structure and is utilized to pull the flowline to the subsea structure with the pullcable.

7. The method of claim 6 wherein the flowline is at least partially lowered onto the sea floor before the pullcable is utilized to pull the flowline to the subsea structure.

8. The method of claim 6 wherein the connection tool is utilized to grip and properly orient the flowline terminaiton, and then utilized to connect the flowline terminaiton to the subsea structure.

9. An apparatus for connecting and laying a flowline from a subsea structure on the seafloor comprising:
   a pullcable for connecting the flowline from a first vessel to a riser from a second vessel;
   means for deploying the flowline and the riser simultaneously downwardly toward the sea floor;
   a connecting tool for (a) connecting the riser to the subsea structure; (b) pulling the flowline via the pullcable up to the subsea structure; (c) gripping and orienting the flowline; (d) connecting the flowline to the subsea structure; and (e) disconnecting from both the flowline and the subsea structure prior to recovery to the surface; and
   means for laying the flowline on the seafloor from the subsea structure.

* * * * *